May 14, 1929.  F. KADE  1,712,669
COMPENSATED ALTERNATING CURRENT MOTOR
Filed March 4, 1926
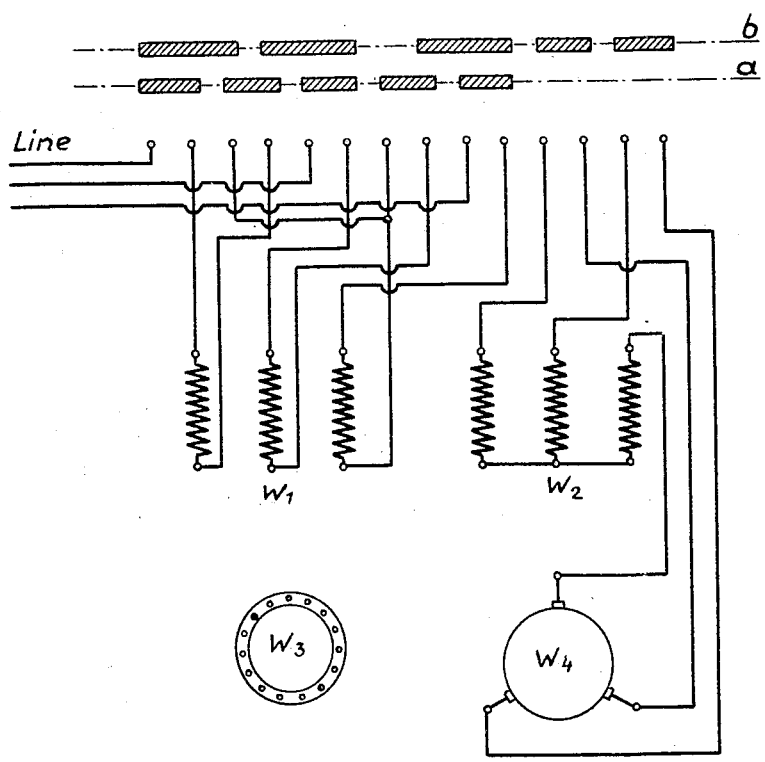
Inventor:
Friedrich Kade Patented May 14, 1929.

1,712,669

UNITED STATES PATENT OFFICE.

FRIEDRICH KADE, OF KIEL, GERMANY, ASSIGNOR TO DEUTSCHE WERKE KIEL AKTIENGESELLSCHAFT, OF KIEL, GERMANY, A CORPORATION OF GERMANY.

COMPENSATED ALTERNATING-CURRENT MOTOR.

Application filed March 4, 1926, Serial No. 92,359, and in Germany March 6, 1925.

The present invention relates to improvement in compensated asynchronous alternating current motors.

Compensated asynchronous alternating current motors usually are provided with two separate windings on the stator or primary part, one of which is connected with the main line, the other one, the auxiliary winding, is adapted to supply the exciting or commutator winding, arranged on the secondary part, with current across a commutator. In addition to the exciting winding a squirrel cage winding is arranged on the secondary part.

During the starting period of such a motor usually both secondary-rotor-windings are active. Their resulting effect is equal to that of one rotor winding, the resistance of which, when referred to the number of turns of the primary winding is of the same size as the combined resistances of both windings. The absorbed current and the developed torque of the motor are dependent on the value of these combined resistances. The starting conditions of such a motor nearly correspond to these of a normal asynchronous squirrel-cage motor.

The unfavourable starting conditions of this class of motors have limited their application. The object of my invention is to improve the starting conditions by switching off the commutator winding from the feeding current source during starting and switching it on only after the motor has run up to speed. In the moment of starting this motor, the secondary part has only the resistance of the squirrel cage winding. In this way it is attained that the starting torque is substantially greater and the starting current substantially less than with those compensated squirrel cage motors in which both secondary windings are operative at starting.

The motor may be further improved by properly dimensioning the two rotor windings. When designing a compensated squirrel cage motor which starts with both rotor windings short-circuited the designer will try to put into the squirrel cage winding as much as possible of the total copper section, because of the cheapness and of the compactness of this winding in order to get the highest effect out of the least mass of copper. In a motor designed along these lines, the squirrel cage winding carries the largest portion of the total load current, the collector winding being mostly restricted to carry the exciting current of the motor. When reducing the resistance of both these windings to the same scale, for instance, to the number of turns of the primary main-winding, it will be found that the squirrel cage winding amounts to about the third or fourth part of the resistance of the collector winding. If such a motor starts in accordance with this invention, i. e. with the squirrel cage winding, the collector winding being open during starting, the decrease of starting current and the increase of starting torque, compared with those of a motor running up to speed with both windings short-circuited, will still be comparatively inconsiderable. In order to further improve the motor in this respect, the distribution of the total copper area between the two windings is altered by reducing the cross sections of the bars and end rings constituting the squirrel cage, thus increasing the resistance of this winding, and by enlarging the cross section of the turns of the collector winding thus decreasing the resistance of this winding, in such a way that the combined resistances of these two windings (reduced to the same number of turns) remain the same as before. In starting this improved motor the higher resistance of the squirrel cage (the collector winding being open during starting) will result in a higher starting torque and in a smaller starting current as in the original motor. This effect will be obtained to the desired degree if the reduced resistance of the squirrel cage winding is equal or about equal to the reduced resistance of the collector winding, the resistance of the squirrel cage being of about double the value of the combined resistances of both secondary windings. The resistance of one winding with turns $w\,1$ can be reduced or referred to another winding of turns $w\,2$ by multiplying the resistance of the first winding by the ratio $$\left(\frac{w\,2}{w\,1}\right)^2$$

If the windings are treated in this way, i. e. if they are both reduced with respect to one and the same number of turns, they can be directly compared in reference to their resistance values. This can be done also with cage armature windings, as these are none other than poly-phase windings. By the aid of formulæ well known in the electro-technic, as shown below, the resistance of the cage winding (consisting of bars and rings) is converted to a number of turns 1 and this number multiplied by the square of the number of turns of the stator, in order to obtain the resistance of the cage armature winding, reduced to the stator winding.

Cage winding:
$n$ equals number of bars
$r_s$ equals resistance of one bar
$r_r$ equals resistance of one ring
$p$ equals number of poles
$w$ equals winding turns of one phase of the three-phase wound stator.

The resistance of the cage winding reduced to one stator phase.

$$R_s \text{ equals } 3\,(2\,w)^2\left(\frac{r_s}{n}+\frac{2r_r}{p^2.n^2}\right)$$

If for example the reduced resistance of the cage winding of a normal machine is one-third that of the commutator winding, whilst with my invention the reduced resistance of the commutator winding is equal to that of the working winding, the copper cross-section of the commutator winding in this machine with equal number of turns must be twice as great as with the normal machine, if the combined reduced resistance of both windings of both machines shall have the same value.

This is also expressed by the following formulæ:
$R_s$ equals the resistance of cage winding, reduced to one stator phase
$R_k$ equals the resistance of commutator winding reduced to one stator phase
$R_c$ equals combined resistance of both windings $$= \frac{R_s R_k}{R_s + R_k}$$

Normal machine:

$$R_{s_n}=\frac{1}{3}R_{k_n};\ \text{hence: } R_{c_n}=\frac{R_{k_n}}{3\left(\frac{1}{3}+1\right)}=\frac{R_{k_n}}{4}$$

Machine according to the invention:

$$R_{s_i}=R_{k_i};\ \text{then } R_{c_i}=\frac{R_{k_i}}{2}$$

If $R_{c_n}$ shall be equal to $R_{c_i}$, then $\frac{R_{k_n}}{4}$ must be equal to $\frac{R_{k_i}}{2}$, or $R_{k_i}=\frac{1}{2}R_{k_n}$.

This is the case if the winding of the machine according to the invention has double the cross section of that in a normal machine, both being assumed to have equal number of turns.

The motor therefore not at all differs regarding slip and losses during the running period from the normal squirrel-cage motor.

The accompanying drawing shows diagrammatically, by way of example a method of execution of the subject-matter of this present invention.

The main winding $w$ 1 connected to the line and the auxiliary winding $w$ 2 are arranged on the stator or primary part.

The auxiliary winding is connected with the exciting winding $w$ 4 of the secondary part in the usual way across a commutator.

In addition to the exciting winding the squirrel cage winding $w$ 3 is mounted on the secondary part. The switching device is provided with the contacts $a$ for starting and with the contacts $b$ for running. It can be seen from the drawing that in the starting position of the switching device the auxiliary winding $w$ 2 and the exciting winding $w$ 4, forming the auxiliary circuit, remain open. They only get closed, as soon as the motor has run up to speed by bringing the switching device into that position in which the contacts $b$ are operated.

The invention practically can be realized best in that way that an ordinary star-delta switching device is mounted upon the motor and the controller drum is so designed that it also can be used for switching off the auxiliary current circuit in the starting position as well as switching on in the working position.

Because the star-delta switching device must be used for starting all the same, no special complication in attending the motor arises by mounting it upon and together with the motor.

There is of course no difficulty, to separate the switching device from the machine. In this case however a great deal of wire must be laid between the switch and the motor whence arises possibility of a faulty connection.

The direct connection of motor and switching device therefore must be preferred at any possible case.

What I claim and desire to secure by Letters Patent is:

1. In a compensated asynchronous alternating current motor provided with a primary or stator winding, an auxiliary winding mounted on the stator, a rotor having an exciting or commutator winding and a squirrel cage winding, a commutator, commutator brushes resting permanently on the commutator and being connected with said auxiliary winding, the resistance of said squirrel cage winding amounting to more than the third part of the resistance of the commutator winding when referred to the same standard, switching means for switching off said commutator winding from the feeding current source during starting and for switching on said commutator winding when the motor is up to speed.

2. In a compensated asynchronous alternating current motor provided with a primary or stator winding, an auxiliary winding mounted on the stator, a rotor having an exciting or commutator winding and a squirrel cage winding, a commutator, commutator brushes resting permanently on the commutator and being connected with said auxiliary winding, the resistance of said squirrel-cage winding being equal or about equal to the resistance of the commutator winding when referred to the same standard and of about the value of the combined resistance of both secondary windings, switching means for switching off said commutator winding from the feeding current source during starting and for switching on said commutator winding when the motor is up to speed.

In testimony whereof I affix my signature.

FRIEDRICH KADE.